Aug. 29, 1933.   G. P. PIGANEAU   1,924,254
SERVO BRAKE OF THE CENTRIFUGAL TYPE
Filed Jan. 31, 1928   6 Sheets-Sheet 1

G. P. Piganeau
INVENTOR

By Marks & Clark
ATTYS

Aug. 29, 1933.  G. P. PIGANEAU  1,924,254
SERVO BRAKE OF THE CENTRIFUGAL TYPE
Filed Jan. 31, 1928  6 Sheets-Sheet 4

Fig. 8

G. P. Piganeau
INVENTOR
By Marks & Clerk
Attys.

Patented Aug. 29, 1933

1,924,254

UNITED STATES PATENT OFFICE 1,924,254

SERVO-BRAKE OF THE CENTRIFUGAL TYPE

Gerard Pierre Piganeau, Clichy, France

Application January 31, 1928, Serial No. 250,908
and in France February 9, 1927

7 Claims. (Cl. 188—140)

The present invention relates to centrifugal servo-brakes adapted to brake in both directions.

The principal object of the apparatus is to reduce the driver's effort on the pedal for braking purposes. Another object of the invention consists in providing means for the automatic release of the rear brakes if for any reason the motion of the rear wheels is stopped with the vehicle still running for instance when the tires fail to adhere to the ground.

A further object of the invention consists in the provision of means whereby the centrifugal governor which actuates the brakes is constantly driven at reduced speed, the speed being increased when the brakes are to be applied.

A still further object of the invention consists in providing means for allowing the immediate return of the servo-brake to its inoperative condition when the braking action is to be stopped.

A still further object of the invention consists in driving the servo-brake centrifugal governor by the motor of the vehicle and providing an automatic change-speed device whereby said governor is rotated at a substantially constant speed for braking purposes.

The accompanying drawings illustrate embodiments of the invention, which are given by way of example.

Referring to the drawings.

According to an improved form of the invention.

According to another improved form of the invention.

As shown in the present example (Figs. 1—5) the apparatus comprises a stationary cylindrical member 1 slotted lengthwise at 2 and rotatable in ball bearings 3 placed at each end and fitted into the tight casing 4. In the member 1 is slidable a shaft 5 in which is formed the slot 6 extending between the lines 12a and 12b, placed in coincidence with the slot 2 in the member 1. The end 5ª of the shaft 5 may be attached to the member 7 upon which the traction is to be exercised.

In the superposed slots 2 and 6 respectively formed in the member 1 and the shaft 5, are slidable, one upon the other, the members 8 and 8ª, having at their ends the respective heavy pieces 9—9ª; the other ends of the members 8—8ª, have the shape of forks whose branches respectively guide the heavy piece on the end of the other member 8 or 8ª. The member 8 is connected with the other end of the member 8ª by a spring 10.

The members 8—8ª comprise ramps forming two triangular recesses symmetrically placed in the opposite position, which make contact with the respective plates or blocks 11—11ª, due to the pressure of the spring 23, and said ramps may cause a scissors movement of the members 8—8ª, whereby the size of the triangles they form may be increased or diminished.

Into the superposed slots 2—6 of the respective members 1 and 5 are also inserted the plates 11—11ª; one plate 11 remains in contact with the face 12 of the slot 2 in the member 1; the other plate 11ª is in contact with the face 12ª of the slot in the shaft 5 (Fig. 1); this shaft is slidable in the stationary member 1, so that the plate 11ª is movable. As above stated, the said plates make contact with the triangular recesses formed by the ramps of the members 8—8ª.

A clutch device 13 is placed at the end of the tubular member 1 and is mounted in ball bearings; said device serves to impart the rotation to the member 1, which will draw with it the various members above mentioned, i. e. the internal shaft 5, the members 8—8a, and the plates 11—11a.

Figures 3, 4, 5:
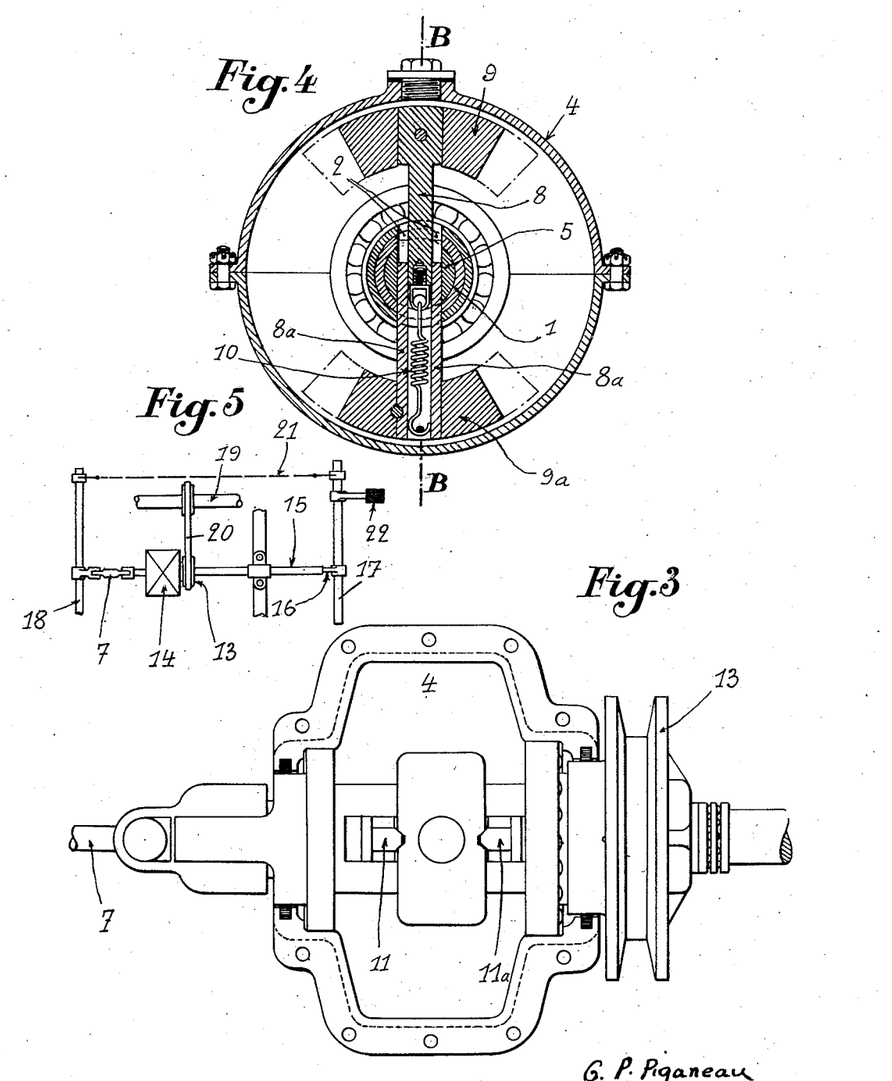
Fig. 3 is the corresponding plan view.
Fig. 4 is a cross section on the line A—A of Fig. 1.
Fig. 5 is a diagrammatic view showing on a smaller scale the application to a motor-vehicle of an apparatus according to the invention.

Fig. 5 shows by way of example a very simple construction of the said apparatus, but it is obvious that other constructions may be employed.

The self-regulating servo-brake represented at 14 in Fig. 5 is connected at a point near the front end of the vehicle by the clutch control shaft 15 with a push-piece 16 acting upon said shaft and disposed on the pedal shaft 17. At the rear end, the device is connected by the control 7 with the brake shaft 18.

The rotation is imparted to the clutch 13 by the Cardan device 19 by means of the belt 20 or like driving means.

With the apparatus arranged as shown in the drawings, and with the vehicle in the stationary position, the brakes may be thrown by the usual controls 21 without the use of the servo-brake.

When the vehicle is travelling, the driver may use the servo-brake by exercising a slight pressure with the foot upon the pedal 22, thus placing the brake shoes in contact with their drums and obtaining an easy braking. By exercising a somewhat stronger pressure upon the pedal, the driver may throw on the clutch of the servo-brake, thus imparting to the member 1 the rotation of the Cardan shaft; the member 1 thus rotates the members 8—8a carrying the heavy pieces or weights 9—9a which act by centrifugal force to move from the centre and thus draw out the ramps of the members 8—8a, whose scissors motion reduces the size of the symmetrically opposite triangular recesses, in contact with the plates 11—11a (Fig. 2), and due to the reduction of said recesses, the plates 11—11a will tend to move apart. Since the plate 11 is stationary, the plate 11a will move through the entire stroke, and it presses on the side of the slot 12a in the shaft 5 which will thus move in like manner.

The brake control 7 is attached to the end 5a of the shaft 5 and will hence follow the movements of the latter, thereby drawing upon the brake lever which it controls, and this traction will depend upon the speed of the vehicle, the speed of rotation of the said heavy pieces being assured by the Cardan shaft.

Figure 1:
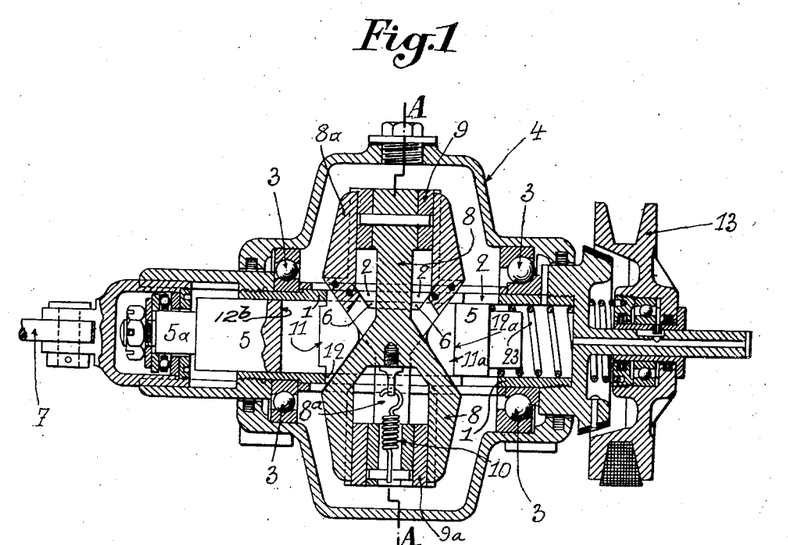
Fig. 1 is a lengthwise section on the line B—B of Fig. 4 showing an apparatus according to the invention in the inoperative position.
Figure 2:
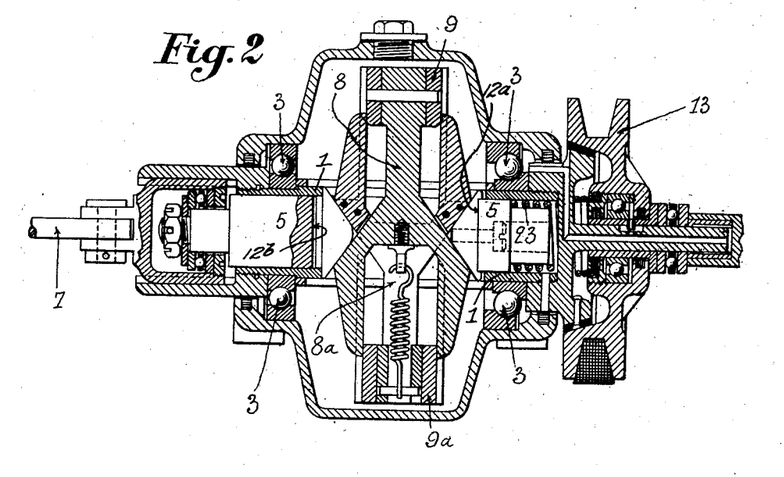
Fig. 2 is a view analogous to Fig. 1, showing the apparatus in the traction position.

If the rear wheels are held fast and the Cardan shaft M is thus stopped, the clutch controlled by said shaft will be stopped and this shaft will cease to rotate, so that the said device will be held in the fixed position. Since the heavy pieces or weights 9—9a, are no longer subjected to centrifugal force, they will assume their central position, and the ramps of the members 8—8a, controlling said heavy pieces will move in the contrary direction, thus increasing the surface of the triangular recesses, so that the plates 11—11a can approach one another under the action of the spring, 23 and the shaft 5 will release the brake control 7 (Fig. 1).

Since the brakes are released, the wheels will now begin to rotate, and if the driver has still maintained his pressure on the pedal, the brakes will again be thrown, the device being placed in action by the Cardan shaft 19.

It is evident that the use of the said device will obviate the serious disadvantage caused by the bending of the front springs when the vehicle is braked at high speed, which tends to throw the rear brakes more strongly than the front brakes, the rear brakes being more rigidly mounted.

According to an improvement in the apparatus above described, I replace the single clutch by a change-speed device of such construction that the shaft of the said rotating weights will be constantly driven by the Cardan shaft, but herein this action takes place at a reduced speed and without braking, when the vehicle is travelling at the normal speed. The transfer from this slow speed to the speed of the said driving pulley, by which the servo-brake is made to control the rod-and-link gear, is effected by the brake pedal.

The principal features of said improvement are specified in the following description with reference to the appended drawings (Figs. 6 and 7) which are given by way of example.

Figures 6, 6A, 7:
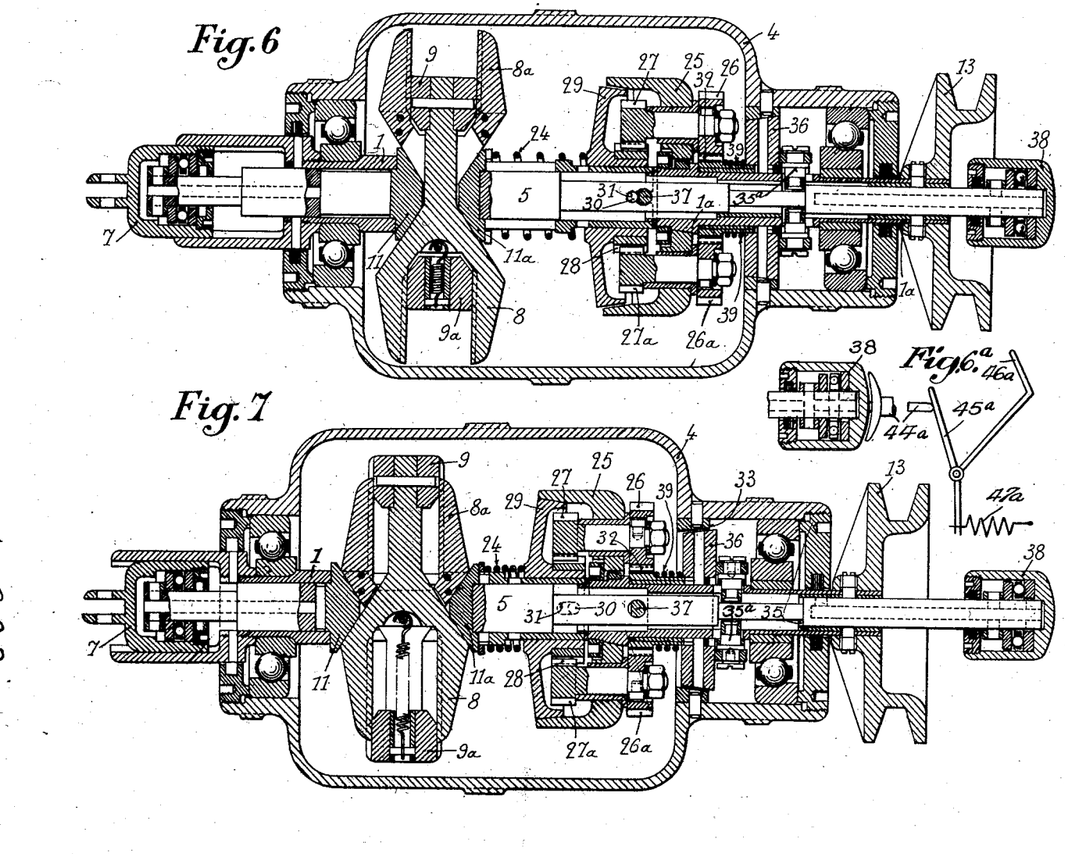
Fig. 6 is a lengthwise section of the complete servo-brake apparatus in the inoperative or slow speed position.
Fig. 6a shows diagrammatically for the position of Fig. 6, the pedal and its connections for operating the servo-brake.
Fig. 7 shows the same apparatus when operating at high speed for braking purposes.

In the form of construction above described, the shaft 5 is provided in the casing 4 with the same members 8 and 8a supporting the heavy pieces 9 and 9a. The members 8—8a have the same lateral ramps, forming triangular recesses placed symmetrically in opposition, in which are caused to bear the plates 11—11a urged by the spring 24. The said ramps may have a scissors effect when the weights 9—9a move from or towards the axis of the shaft 5, and this scissors effect causes the wedge-shaped member 11a to move lengthwise, whilst the other wedge-shaped member 11 has the fixed position.

According to said improvements, a cylindrical member consisting of two distinct parts 1 and 1a is mounted on the shaft 5. The tube 1 has the same slots as the shaft 5 for the insertion and the free motion of the members 8 and 8a.

A clutch disc 25 is keyed to the tube 1a, and it has mounted thereon (for instance) two pairs of coacting planetary pinions comprising the pinions 26 and 26a which are symmetrical with reference to the axis of the apparatus, and the pinions 27 and 27a, which have a like symmetrical position. The pinion 27 is mounted on the same shaft as the pinion 26, and the pinion 27a on the same shaft as 26a. The diameter of the set of pinions 27—27a is less than the diameter of the set of pinions 26 and 26a, in the reduction ratio chosen for the change-speed device of the said apparatus.

The pinions 27 and 27a coact with the gear wheel 28 mounted on the clutch cone 29 which is keyed to the member 1 but has a certain longitudinal play thereon, since the key 30 is slidable in the oval aperture or mortise 31 of the member 1. The large pinions 26 and 26a coact with the gear wheel 32 which is rotatable on the member 1. The wheel 32 is secured to the clutch cone 36 which is in friction engagement with the stationary friction member 33 secured to the casing 4 and may be entirely held against the latter.

By another movement, the clutch disc 25 may coact with the cone 29 which as above specified is keyed with lengthwise play to the member 1.

One end of the shaft 5 is secured to the forked bracket 7 pertaining to the rod-and-link gear of the brakes, and at its other end the shaft projects from the casing 4 through the bore of the tube 1a and it carries the tappet or push piece 38 which is acted upon by the end of a rod 44a, whose other end may be pushed towards said push-piece 38 by a lever 45a mounted on the brake pedal 46a when in its inoperative position (Fig. 6), under the effect of the reaction springs 47a. The pulley 13, which is actuated by the Cardan shaft, is keyed directly to the tube-shaped member 1a.

The shaft 5, whose above specified construction is herein modified further comprises a shoulder 35, coacting with a roller carrier 35a slidingly mounted in the tube 1a and adapted to bear on the small clutch cone 36, so as to bring the said cone into contact with the stationary friction member 33 when in the inoperative position. The shaft 5 also carries a stud 37 which acts upon the large clutch cone 29 in the inoperative position, in order to separate this latter from the disc 25.

The operation of the apparatus at slow speed is as follows. Since the driver does not press upon the brake pedal, this latter is brought back with some force by its springs, thus pressing, on the inoperative position, upon the push-piece 38 which is thus driven into the central recess of the pulley 13, as shown in Fig. 6. The push-piece 38 is secured to the shaft 5, as above mentioned, and hence it will press upon the plate 11a, thus acting against the centrifugal force of the heavy pieces 9—9a.

The pulley 13 drives the tube 1a upon which it is mounted, but the shoulder 35 of the shaft 5 presses the roller carrier 35a and the small clutch cone 36 against the stationary friction member 33; the said cone 36 and the pinion 32 connected therewith will thus be stationary. The tube 1a rotates in the bore of this pinion 32, and it drives at a like speed the clutch disc 25, this being separated from its coacting cone 29 but driving the axles of the sets of pinions 26—27 and 26a—27a. The pinions 26 and 26a are only allowed to roll upon the stationary pinion 32; their coacting pinions 27—27a rotate the pinion 28, but at a reduced speed, which is due to the ratio of the diameters of the two pairs of pinions. Since the pinion 28 is keyed to the tube 1 (as observed) it will drive this latter, but at a slower speed than that of the tube 1a, and in the same reduction ratio.

In this manner, I obtain for the tube 1 and the weights 9—9a, a permanent slow speed as long as the driver exercises no pressure on the pedal and does not employ the servo-brake. At this slow speed the centrifugal force of the weights 9—9a is insufficient to overcome the effect of the reaction springs of the pedal.

When the driver presses upon the pedal, the said springs no longer act. The push-piece 38 is released, and the shaft 5 is also released, since it is pushed by the wedge plate 11a due to the scissors effect of the weights 9—9a which are urged apart by the centrifugal force. The shoulder 35 of the shaft 5 no longer makes contact with the roller carrier 35a and the small clutch cone 36 is separated from the stationary casing 4 by a suitable spring 39. The cone 36 and the pinion 32 are no longer held against the casing 4.

The stud 37 of the shaft 5 no longer presses upon the large clutch cone 29, and this cone, being acted upon by the spring 24, which imparts to it the action of the plate 11a, is now pressed against the clutch disc 25. This affords the direct drive between the tubes 1 and 1a, due to the clutch action of the cone 29 upon the disc 25, so that the shafts 1 and 1a, rotate at the same speed. The weights 9—9a are separated with great force, and the shaft 5— through action of the plate 11a—now draws upon the rod-and-link gear of the brakes, as above specified.

During this time, the pinions 26—26a, 27—27a, which are rotated by 28, impart this rotation simply to the pinion 32 which turns loose on the tube 1a, and hence they remain without any effective action during the high speed operation.

It should be noted that the pressure of the spring 24 effecting the clutch action between the cone 29 and the disc 25 increases with the centrifugal action of the members 8—8a pushing against the plate 11a.

By the use of the said change-speed device, all abrupt action occasioned by a single clutch will now be obviated. The wear of the apparatus is also reduced, while at the same time the said apparatus possesses all the advantages of the apparatus first described.

Further improvements in said device relate chiefly to the following features:

1. I provide for the rapid braking of the masses in movement as soon as the action of the servo-brake is to be discontinued, so as to allow the immediate return of the heavy members or weights to the position in which the servo-brake is inoperative.

2. I am enabled to modify the method of actuating the said weights at reduced speed, as above specified, thus to simplifying the construction and to allowing the immediate return of the said weights to the inoperative position.

3. The weights are actuated by the use of the power supplied to the vehicle by the engine, through the medium of an automatic change-speed device, whereby a practically uniform braking will be assured irrespectively of the speed of travel of the vehicle.

The principal features of said improvements are further specified in the following description with reference to the appended drawings (Figs. 8—13) which are given solely by way of example.

Figure 8:
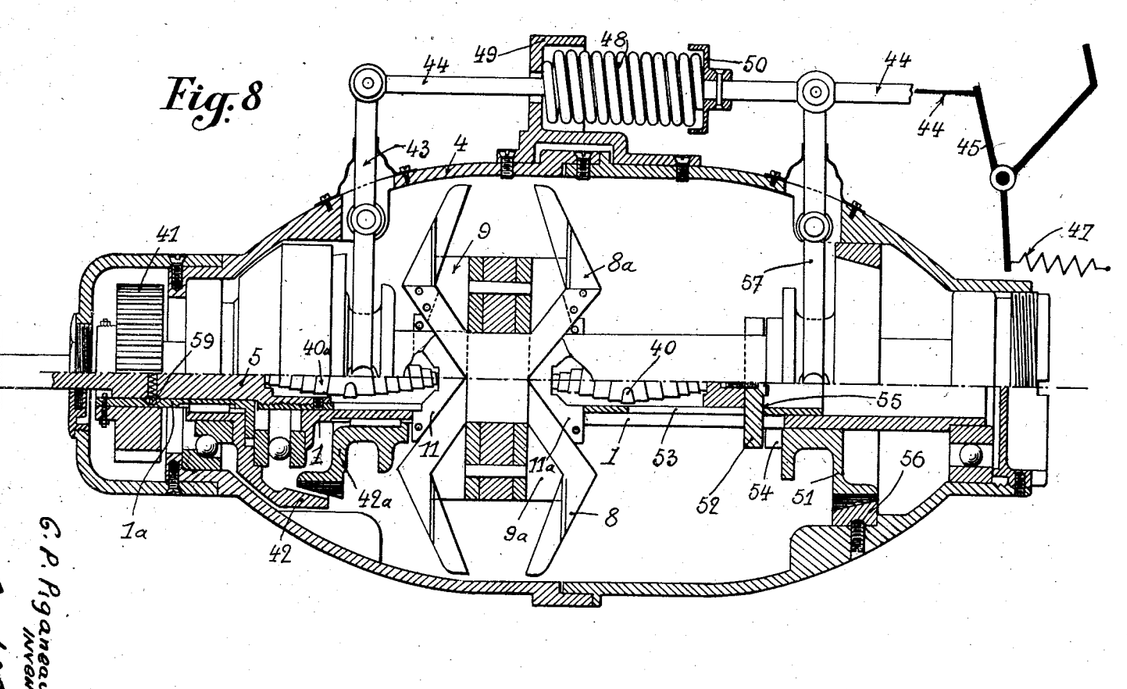
Fig. 8 is an axial section showing the whole apparatus in the inoperative position.
Figure 9:
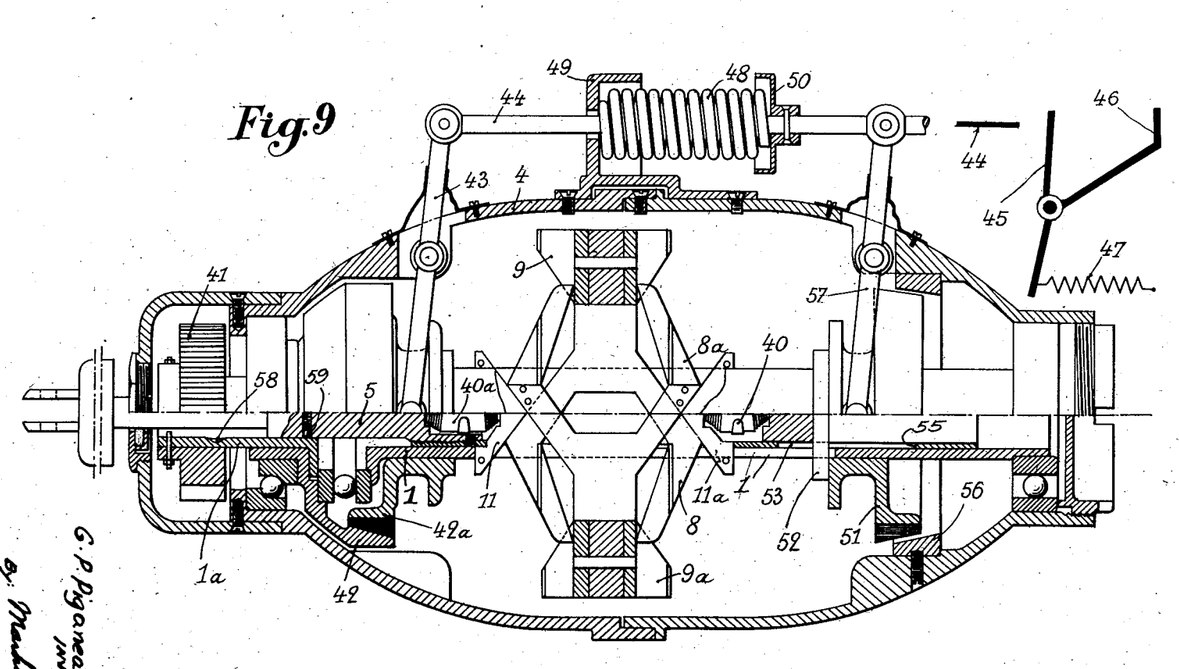
Fig. 9 is a like view, with the device in the position for braking the vehicle.

In the construction herein represented, the apparatus, in the same manner as above specified, comprises the members 8—8a, controlled by the springs 40—40a and supporting the weights 9—9a which act in the same manner upon the cylindrical member 1 and the shaft 5 by means of the plates or wedges 11—11a, all of the said parts being contained in the casing 4.

According to one of the features of the present improvements, the apparatus shown in Figures 8 and 9 comprises a pinion 41 which is driven by the intermediate shaft of the change-speed box of the motor vehicle and is secured to the tube-shaped member 1a to which is keyed the clutch disc 42. The shaft 1 is distinct from the shaft 1a, and the clutch cone 42a is slidable thereon by means of a key. A fork 43 engaged in a groove in the cone 42a is pivoted to the end of a rod 44 whose other end is in contact with a lever 45 mounted on the pedal 45, which latter is connected to a spring 47 attached to a fixed point of the vehicle frame. A spring 48 is traversed by the rod 44. It is connected at one end with an abutment 49 of the casing 4, and at the other end with a collar 50 mounted on the rod 44. The spring 47 is stronger than the spring 48, whereby in the inoperative position, levers 45 and 44 assume their extreme positions towards the left (Fig. 8). At the other end of the shaft 1 is loosely mounted a braking cone 51 which may participate in the rotation of said shaft by means of a transverse key 52 inserted through an aperture 53 formed in the shaft 5 and also through the aperture in the shaft 1 and adapted for engagement between the clutch teeth 54 formed upon one face of the cone 51. One face of the aperture 53, forms an abutment 55 for the key 52. A ring 56 is secured to the casing 4. The braking cone 51 may engage with said ring, and it is provided with a groove engaging a fork 57 which is pivoted to the rod 44.

In the shaft 1ª is formed an annular groove serving as a race 58 for a ball 59, which is applied against the said groove by the action of a spring which is disposed, together with the ball, in a transverse recess formed in the shaft 5.

Figures 10, 11, 12, 13:
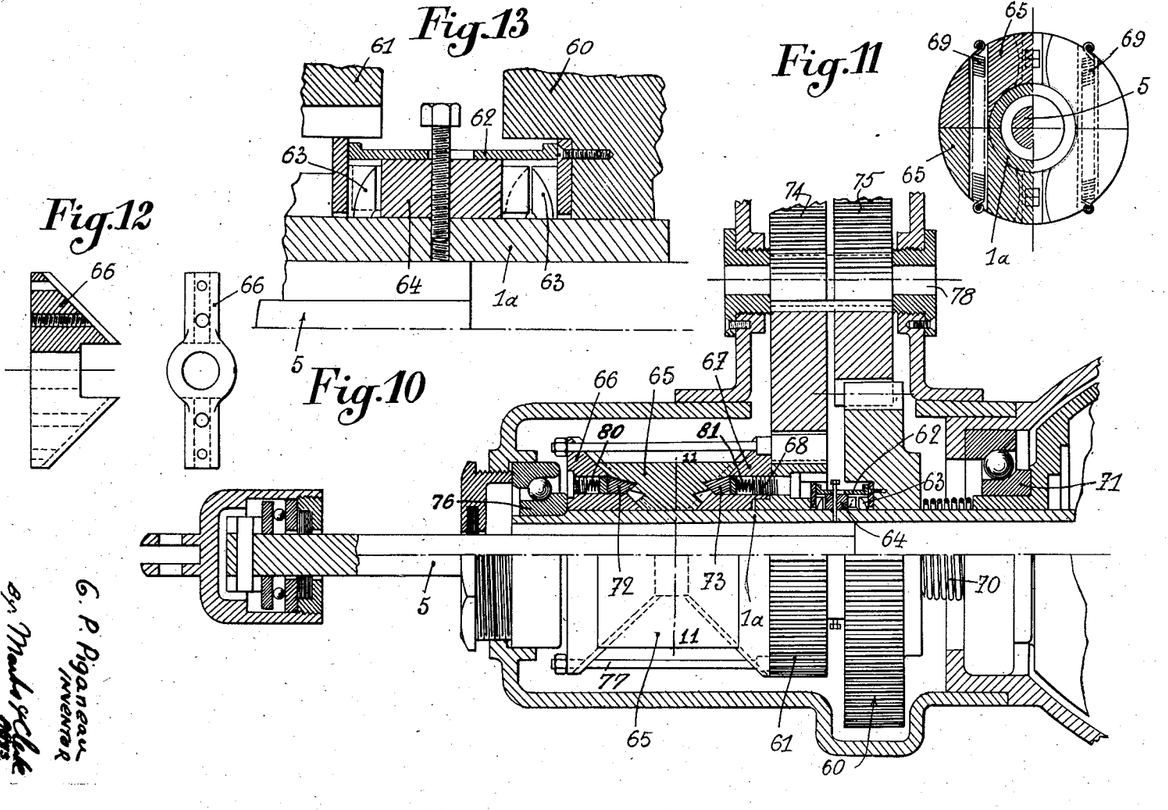
Fig. 10 is an axial section of the automatic change-speed device for actuating the apparatus for different speeds of the vehicle.
Figs. 11, 12 and 13 are detail views of the said change-speed device, Fig. 11 being a section on line 11—11 of Fig. 10.

As an alternative arrangement, the device shown in Figs. 8 and 9 may be used in combination with the automatic change-speed device of Fig. 10 which serves as a substitute for pinion 41 of Figs. 8 and 9 and which comprises, instead of the single pinion 41 of Figs. 8 and 9, two pinions 60—61 which are mounted loose and are slidable on the shaft 1ª; said pinions engage two corresponding pinions 74 and 75 which are driven at the same speed on the shaft 78 by the change-speed box. The pinions 60—61 are connected together in their lengthwise movement by the cross-piece 62, and are provided upon their oppositely-situated faces with the clutch teeth 63 adapted for engagement with like teeth formed upon a block 64 which is keyed to the shaft 1ª. Two heavy members 65 provided with guides, are slidable in two guides 66—67 symmetrically placed in the opposite position and mounted loose on the shaft 1ª. The faces of said guides 66, 67 are symmetrically inclined and form a recess which can be exactly filled by the guides of the said heavy weights which are inversely inclined. The guide 67 is secured to the pinion 61 by means of the screw 68 and the guides 66 and 67 are connected together by the bolts 77. The members 65, 66, 67 and 61 rotate thus constantly as a whole at a speed which is proportional to the speed of the vehicle. The weights 65 are controlled by two reaction springs 69. The spring 70 which is coaxial with the shaft 1ª abuts at one end against the ball-bearing 71 and at the other end against the pinion 60. Two releasing arms 72 and 73 urged towards the weights 65 by springs 80 and 81 engage in respective notches provided upon the said heavy weights.

The operation of the said device is as follows:

In the inoperative position (Fig. 8) of the servo-brake, i. e. in the normal functioning of the vehicle, the pedal 46 being out of action, the spring 47 will exercise upon the rod 44—through the medium of the lever 45—a constant pressure by which the spring 48 is compressed between the collar 50 mounted on the rod 44, and the abutment 49 secured to the casing. The rod 44 being driven to its farthest rearward position, will hold the cone 42ª apart from the ring 42, through the medium of the fork 43 and the braking cone 51 in contact with the ring 56 through the medium of the fork 57. In this position, the transverse key 52 is urged by the spring 40, which has now almost entirely expanded, against the face 55 of the aperture 53, in the shaft 5, and it thus engages the clutch teeth 54. The tube 1 and the shaft 5 are thus independent of the cone 51 and are freely rotatable. Since the clutch 42—42ª is released, the shaft 1ª, is separated from the shaft 1 and is only connected with the shaft 5 by means of the friction device 58—59. The shaft 1ª is constantly driven by the pinion 41 which is connected by a set of gearing with an intermediate shaft of the change-speed box. It partially drives in turn the shaft 5, due to the adhesion between 1ª and 5 increased by the pressure of the ball 59 impelled by its spring. The speed of rotation thus imparted to the shaft 5 is not sufficient to spread apart the said weights.

When the driver presses upon the pedal 46 (Fig. 9), he releases the rod 44 controlling the forks 43 and 57. The spring 48 which is thus released exercises upon the collar 50 a pressure which tends to move the rod 44 towards the pedal 46. The rod thus moves the forks 43 and 57, which respectively control the clutch cone 42ª and the brake cone 51. Due to the movement of the fork 57, the cone 51 is caused to slide upon the shaft 1, and this cone is separated from the ring 56. In this manner the cone 51 is made independent of the casing 4 while at the same time its clutch teeth 54 coact with the key 52 which is urged by the spring 40. Since the said key is rotatable with the tube 1, thi. latter is secured to the braking cone 51.

Since the fork 43 is displaced at the same time as the fork 57, the clutch member 42ª which is keyed and may rotate upon the tube 1 will be placed in direct drive with the clutch member 42 which is constantly rotated. The shaft 1 controlling the weights 9—9ª will thus rotate the shaft 5 which is displaced as above specified. Since the face 55 of the recess 53 in the shaft 5 is also displaced, it will be no longer in contact with the key 52, which however maintains its position inasmuch as it is engaged with the teeth 54.

When the pedal 46 is released, the spring 47 acts upon the end of the rod 44 in order to return it to the inoperative position; in this movement, the fork 43 separates the clutch cone 42ª from the ring 42, whilst the fork 57, brings the braking cone 51 into contact with the ring 56.

The cone 51 is still engaged with the shafts 1 and 5 through the medium of the key 52 and the clutch teeth 54; its friction upon the ring 56 will thus assure the instant braking of the shaft 1, and the weights 9—9ª will be brought together. The shaft 5, which is driven back by the spring 40ª, bears by means of its face 55 upon the key 52, thus releasing it from the teeth 54. The cone 51 is thus again released from the shafts 1 and 5, and these may now be driven at reduced speed by the friction of the hollow shaft 1ª on the shaft 5.

The automatic change-speed device (Fig. 10) requires the use of two intermediate pinions 60 and 61 for the control, instead of a single pinion 41 as before. When the speed of the vehicle is reduced, the weights 65 which are held by the arms 72 and 73 will not obey a centrifugal force which is below the antagonistic force of the spring 69.

Since the sliding members of the said weights fill up the maximum space between the ramps of their guides, the high-speed pinion 61 will engage the toothed block 64 and consequently the shaft 1a will be operatively connected with the members 61—65—66—67. The low-speed pinion 60 which is held by the cross-piece 62 will be separated from the said block 64, since the action of its spring 70 is less than the action of the springs 69 of the weights, so that it will rotate freely on the shaft 1ª. In this manner the shaft 1a of the servo-brake will rotate at an increased speed.

When the speed of the vehicle exceeds the determined speed for the release of the weights, the pinion 61 whose speed is proportional to the speed of the vehicle, will impart this speed to the weights, through the medium of the guides 66, 67, so that the weights will move apart, thus allowing the guide 67—which is urged by the spring 70—to move towards the other guide 66 which is in contact with the ball-bearing 76 of the casing. The spring 70, which is thus released, now moves the pinions 60 and 61, thereby disengaging the pinion 61 and engaging the pinion 60 with the toothed block 64 and consequently the shaft 1a. The shaft 1a of servo-brake now rotates at a reduced speed, and the pinion 61 will rotate freely on said shaft 1a.

If the speed of the vehicle has just been reduced the said weights, urged by their springs 69, will tend to assume the inoperative position, thus driving back the guide 67 and the pinion 61 which will again engage the toothed block 64; at the same time the cross piece 62 drives back the pinion 60 which releases the block 64 while compressing the spring 70. The shaft 1a of servo-brake now rotates at the increased speed.

Having now described my invention, what I claim as new and desire to secure by Letters Patent is:

1. A centrifugal servo-brake comprising in combination a rotatable shaft, radial guiding means provided on said rotatable shaft, a sliding member adapted to slide in said guiding means and to rotate with said shaft and provided with a heavy mass and with an inclined surface, yielding means adapted to urge said heavy mass towards said shaft, a brake control rod adapted to bear on said inclined surface and yielding means adapted to urge said brake control rod against said inclined surface.

2. A centrifugal servo-brake comprising in combination a rotatable hollow shaft provided with a radial slot, a sliding member adapted to slide in said radial slot and to rotate with said shaft and provided with a heavy mass on the outside of said shaft and with an inclined surface extending in the hollow shaft, yielding means adapted to urge said heavy mass towards said shaft, a brake control rod adapted to slide in said hollow shaft and adapted to cooperate with said inclined surface on said sliding member, and yielding means adapted to urge said brake control rod into engagement with said sliding member.

3. A centrifugal servo-brake comprising in combination a rotatable hollow shaft provided with a radial slot, two sliding members adapted to slide in said radial slot and to rotate with said shaft and provided with heavy masses on opposite sides of said shaft and with surfaces inclined in contrary directions and extending in the hollow shaft, a spring connecting said sliding members and adapted to urge said heavy masses towards said shaft, a brake control rod adapted to slide in said hollow shaft and provided with inclined surfaces adapted to cooperate with said inclined surfaces on said sliding members, and yielding means adapted to urge said brake control rod into engagement with said sliding members.

4. A centrifugal servo-brake comprising in combination a rotatable hollow shaft provided with a radial slot, two sliding members adapted to slide in said radial slot and to rotate with said shaft and provided with heavy masses on opposite sides of said shaft and with surfaces inclined in contrary directions and extending in the hollow shaft, radial guiding means provided on each of said sliding members and along which the heavy mass of the other sliding member is adapted to slide, a spring connecting said sliding members and adapted to urge said heavy masses towards said shaft, a brake control rod adapted to slide in said hollow shaft and provided with inclined surfaces adapted to cooperate with said inclined surfaces on said sliding members, and yielding means adapted to urge said brake control rod into engagement with said sliding members.

5. A centrifugal servo-brake comprising in combination a rotatable hollow shaft provided with a radial slot, a brake control rod adapted to slide in said hollow shaft and also provided with a radial slot, at least a sliding member adapted to slide in said radial slots and to rotate with said shaft and with said control rod and provided with a heavy mass on the outside of said shaft and with an inclined surface extending in the hollow shaft and adapted to cooperate with one face of the slot in the control rod, yielding means adapted to urge said heavy mass towards said shaft and other yielding means adapted to urge said brake control rod into engagement with the inclined surface of said sliding member and to urge together said sliding member against the opposite face of the slot in the hollow shaft.

6. A centrifugal servo-brake comprising in combination a driving shaft, a driven shaft, a driving clutch member keyed on said driving shaft, a driven clutch member splined on said driven shaft and adapted to cooperate with said driving clutch member, a stationary friction ring, another friction ring adapted to slide on said driven shaft, to rotate with said driven shaft and to cooperate with said stationary friction ring, pivoted levers connecting the driven clutch member and the slidable friction ring, whereby the friction rings engage each other when the clutch members are separated and vice versa, operating means for moving said pivoted levers, radial guiding means provided on said driven shaft, a sliding members adapted to slide in said radial guiding means and to rotate with said driven shaft and provide with a heavy mass and with an inclined surface, yielding means adapted to urge said heavy mass towards said driven shaft, a brake control rod adapted to bear on said inclined surface and yielding means adapted to urge said brake control rod against said inclined surface.

7. A centrifugal servo-brake comprising in combination a driving shaft, an intermediary shaft, a driven shaft, a centrifugal speed governor operatively connected with said driving shaft, a speed changing device between said driving shaft and said intermediary shaft, means operated by said speed governor and adapted to control said speed changing device, a clutch device between said intermediary shaft and said driven shaft, radial guiding means provided on said driven shaft, a sliding member adapted to slide in said radial guiding means and to rotate with said driven shaft and provided with a heavy mass and with an inclined surface, yielding means adapted to urge said heavy mass towards said driven shaft, a brake control rod adapted to bear on said inclined surface and yielding means adapted to urge said brake control rod against said inclined surface.

GERARD PIERRE PIGANEAU.